United States Patent
Sun et al.

(10) Patent No.: US 12,250,653 B2
(45) Date of Patent: Mar. 11, 2025

(54) TIMING ADVANCE CONFIGURATION METHOD, TERMINAL AND NETWORK SIDE DEVICE

(71) Applicant: DATANG MOBILE COMMUNICATIONS EQUIPMENT CO., LTD., Beijing (CN)

(72) Inventors: Wei Sun, Beijing (CN); Runhua Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 512 days.

(21) Appl. No.: 17/632,140

(22) PCT Filed: Jul. 31, 2020

(86) PCT No.: PCT/CN2020/106151
§ 371 (c)(1),
(2) Date: Feb. 1, 2022

(87) PCT Pub. No.: WO2021/023103
PCT Pub. Date: Feb. 11, 2021

(65) Prior Publication Data
US 2022/0279467 A1    Sep. 1, 2022

(30) Foreign Application Priority Data
Aug. 2, 2019    (CN) .......................... 201910713150.X

(51) Int. Cl.
*H04W 56/00*    (2009.01)
*H04L 5/00*    (2006.01)
*H04W 72/21*    (2023.01)

(52) U.S. Cl.
CPC ....... *H04W 56/0045* (2013.01); *H04L 5/0048* (2013.01); *H04W 72/21* (2023.01)

(58) Field of Classification Search
CPC . H04W 56/0045; H04W 72/21; H04W 24/08; H04W 24/02; H04W 72/23; H04L 5/0048; H04L 5/0051
See application file for complete search history.

(56) References Cited

U.S. PATENT DOCUMENTS 11,528,700 B2 * 12/2022 Maeda ................ H04W 52/146
2014/0204922 A1    7/2014 Kitae et al.
(Continued)

FOREIGN PATENT DOCUMENTS

| CN | 103782532 A | 5/2014 |
| CN | 108024325 A | 5/2018 |

(Continued)

OTHER PUBLICATIONS

International Search Report for PCT Application PCT/CN2020/106151 issued on Oct. 21, 2020 and its English Translation provided by WIPO.
(Continued)

*Primary Examiner* — Afshawn M Towfighi
(74) *Attorney, Agent, or Firm* — Ladas & Parry, LLP

(57) ABSTRACT

A TA configuration method, a terminal and a network side device are provided. The TA configuration method includes: transmitting, by a terminal, a first SRS to a network side device on N SRS resource sets through N antenna groups respectively, N being an integer greater than 1; and receiving, by the terminal, a first configuration message transmitted by the network side device, the first configuration message being used to configure N TAs, the N TAs corresponding to the N antenna groups respectively, the N TAs being obtained by the network side device through measuring the first SRS on the N SRS resource sets.

20 Claims, 8 Drawing Sheets

(56) References Cited

U.S. PATENT DOCUMENTS

| | | | |
|---|---|---|---|
| 2017/0332358 A1 | 11/2017 | Park et al. | |
| 2018/0262313 A1 | 9/2018 | Nam et al. | |
| 2019/0159156 A1* | 5/2019 | Abedini | H04W 56/0005 |
| 2019/0281571 A1* | 9/2019 | Ren | H04W 56/0045 |
| 2020/0162289 A1* | 5/2020 | Ahn | H04L 5/0053 |
| 2022/0278762 A1* | 9/2022 | Wang | H04B 17/3913 |
| 2022/0279467 A1* | 9/2022 | Sun | H04W 56/0045 |
| 2022/0365163 A1* | 11/2022 | Baek | H04W 4/40 |

FOREIGN PATENT DOCUMENTS

| | | |
|---|---|---|
| CN | 109548133 A | 3/2019 |
| EP | 3528559 A1 | 8/2019 |
| EP | 3614766 A1 | 2/2020 |
| WO | 2018082668 A1 | 5/2018 |
| WO | 2018203680 A1 | 11/2018 |

OTHER PUBLICATIONS

Written Opinion for PCT Application PCT/CN2020/106151 issued on Oct. 21, 2020, and its English Translation provided by WIPO.

Internationally Preliminary Report on Patentability for PCT/CN2020/106151 issued on Feb. 8, 2022, and English translation provided by WIPO.

Extended European Search Report for European Patent Application 20849201.7 issued on Aug. 17, 2022.

"Discussion on uplink multi-panel and multi-TRP operation," 3GPP TSG RAN WG1 Meeting #90, R1-1712541, Prague, P.R. Czechia Aug. 21-25, 2017, Source: Intel Corporation, Agenda item: 6.1.2.1.6, all pages.

* cited by examiner

TIMING ADVANCE CONFIGURATION METHOD, TERMINAL AND NETWORK SIDE DEVICE

CROSS-REFERENCE TO RELATED APPLICATIONS

This application is the U.S. national phase of PCT application No. PCT/CN2020/106151 filed on Jul. 31, 2020, which claims a priority of the Chinese patent application No. 201910713150.X filed in China on Aug. 2, 2019, the disclosures of which are incorporated herein by reference in their entireties.

TECHNICAL FIELD

The present disclosure relates to the field of communication technology, in particular to a Timing Advance (TA) configuration method, a terminal and a network side device.

BACKGROUND

In some communication systems (e.g., a $5^{th}$-Generation (5G) system), a plurality of antenna groups (also called as a multi-antenna panel or a plurality of antenna port groups) is introduced into a terminal. The plurality of antenna groups for the terminal may communicate with a network side device or a plurality of network side devices simultaneously, and communication is also supported through dynamically switching the plurality of antenna groups. However, merely one TA is configured by a network side for the terminal, and when this TA is used by the terminal in the plurality of antenna groups, signal reception quality is deteriorated.

SUMMARY

An object of the present disclosure is to provide a TA configuration method, a terminal and a network side device, so as to prevent the signal reception quality from being deteriorated.

In one aspect, the present disclosure provides in some embodiments a TA configuration method, including: transmitting, by a terminal, a first Sounding Reference Signal (SRS) to a network side device on N SRS resource sets through N antenna groups respectively, N being an integer greater than 1; and receiving, by the terminal, a first configuration message transmitted by the network side device. the first configuration message being used to configure N TAs, the N TAs corresponding to the N antenna groups respectively, the N TAs being obtained by the network side device through measuring the first SRS on the N SRS resource sets.

In a possible embodiment of the present disclosure, the N TAs correspond to the N SRS resource sets respectively.

In a possible embodiment of the present disclosure, the first configuration message is used to indicate adjustment values for the N TAs, and the TA configuration method further includes determining and updating, by the terminal, the N TAs in accordance with the adjustment values for the N TAs and the N TAs maintained by the terminal.

In a possible embodiment of the present disclosure, initial TAs of the N TAs are same.

In a possible embodiment of the present disclosure, the TA configuration method further includes: transmitting, by the terminal. a first signal to the network side device through one or more antennas in the N antenna groups; and receiving, by the terminal, a first TA transmitted by the network side device, the first TA being obtained by the network side device through measuring the first signal, and the initial TA of the N TAs being the first TA transmitted by the network side device.

In a possible embodiment of the present disclosure, the TA configuration method further includes at least one of: transmitting a Physical Uplink Shared Channel (PUSCH) signal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or transmitting, by the terminal, a Physical Uplink Control Channel (PUCCH) signal in accordance with a TA of PUCCH, wherein the TA of the PUCCH is a TA indicated by the network side device, or a TA corresponding to an SRS associated with the PUCCH, or a TA corresponding to an antenna group for transmitting the PUCCH signal; or transmitting, by the terminal, a second SRS in accordance with the updated TA.

In a possible embodiment of the present disclosure, in the case that the TA of the PUSCH is the TA indicated by the network side device, the TA indicated by the network side device is one of the N TAs that corresponds to the PUSCH; and/or in the case that the TA of the PUCCH is the TA indicated by the network side device, the TA indicated by the network side device is one of the N TAs that corresponds to the PUCCH.

In a possible embodiment of the present disclosure, the TA configuration method further includes: transmitting, by the terminal, a third SRS to the network side device on the N SRS resource sets through the N antenna groups respectively; receiving, by the terminal, a second configuration message transmitted by the network side device, the second configuration message being used to indicate an adjustment value for a first TA, wherein the first TA is a TA which is determined by the network side device as having changed through measuring the third SRS on the N SRS resource sets; and determining and updating, by the terminal, the first TA in accordance with the adjustment value for the first TA and the first TA maintained by the terminal.

In another aspect, the present disclosure provides in some embodiments a TA configuration method, including: measuring, by a network side device, a first SRS transmitted by a terminal on N SRS resource sets through N antenna groups respectively to determine N TAs, N being an integer greater than 1; and transmitting, by the network side device, a first configuration message to the terminal, the first configuration message being used to configure the N TAs, and the N TAs corresponding to the N antenna groups respectively.

In a possible embodiment of the present disclosure, the N TAs correspond to the N SRS resource sets respectively.

In a possible embodiment of the present disclosure, the first configuration message is used to indicate adjustment values for the N TAs, to enable the terminal to determine and update the N TAs in accordance with the adjustment values for the N TAs and the N TAs maintained by the terminal.

In a possible embodiment of the present disclosure, initial TAs of the N TAs are same.

In a possible embodiment of the present disclosure, the TA configuration method further includes: measuring, by the network side device, a first signal transmitted by the terminal through one or more antennas in the N antenna groups to determine a first TA; and transmitting, by the network side device, the first TA to the terminal, the initial TA of the N TAs being the first TA transmitted by the network side device.

In a possible embodiment of the present disclosure, the TA configuration method further includes at least one of: receiving, by the network side device, PUSCH signal transmitted by the terminal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or receiving, by the network side device. PUCCH signal transmitted by the terminal in accordance with a TA of PUCCH, wherein the TA of the PUCCH is a TA indicated by the network side device, or a TA corresponding to an SRS associated with the PUCCH, or a TA corresponding to an antenna group for transmitting the PUCCH signal; or receiving, by the network side device, a second SRS transmitted by the terminal in accordance with the updated TA.

In a possible embodiment of the present disclosure, in the case that the TA of the PUSCH is the TA indicated by the network side device, the TA indicated by the network side device is one of the N TAs that corresponds to the PUSCH; and/or in the case that the TA of the PUCCH is the TA indicated by the network side device, the TA indicated by the network side device is one of the N TAs that corresponds to the PUCCH.

In a possible embodiment of the present disclosure, the TA configuration method further includes: measuring, by the network side device, a third SRS transmitted by the terminal through the N antenna groups on the N SRS resource sets to obtain an adjustment value for a first TA, wherein the first TA is a TA which is determined by the network side device as having changed through measuring the third SRS on the N SRS resource sets; and transmitting, by the network side device, a second configuration message to the terminal, the second configuration message being used to indicate the adjustment value for the first TA, to enable the terminal to determine and update the first TA in accordance with the adjustment value for the first TA and the first TA maintained by the terminal.

In yet another aspect, the present disclosure provides in some embodiments a terminal, including: a first transmission module configured to transmit a first SRS to a network side device on N SRS resource sets through N antenna groups respectively, N being an integer greater than 1; and a first reception module configured to receive a first configuration message transmitted by the network side device, the first configuration message being used to configure N TAs, the N TAs corresponding to the N antenna groups respectively, the N TAs being obtained by the network side device through measuring the first SRS on the N SRS resource sets.

In a possible embodiment of the present disclosure, the first configuration message is used to indicate adjustment values for the N TAs, and the terminal further includes a first updating module configured to determine and update the N TAs in accordance with the adjustment values for the N TAs and the N TAs maintained by the terminal.

In still yet another aspect, the present disclosure provides in some embodiments a network side device, including: a first measurement module configured to measure a first SRS transmitted by a terminal on N SRS resource sets through N antenna groups respectively to determine N TAs, N being an integer greater than 1; and a first transmission module configured to transmit a first configuration message to the terminal, the first configuration message being used to configure the N TAs, and the N TAs corresponding to the N antenna groups respectively.

In a possible embodiment of the present disclosure, the first configuration message is used to indicate adjustment values for the N TAs, to enable the terminal to determine and update the N TAs in accordance with the adjustment values for the N TAs and the N TAs maintained by the terminal.

In still yet another aspect, the present disclosure provides in some embodiments a terminal, including a transceiver, a memory, a processor, and a program stored in the memory and capable of being executed by the processor. The transceiver is configured to transmit a first SRS to a network side device on N SRS resource sets through N antenna groups respectively, N being an integer greater than 1. The transceiver is further configured to receive a first configuration message transmitted by the network side device, the first configuration message is used to configure N TAs, the N TAs corresponding to the N antenna groups respectively, and the N TAs are obtained by the network side device through measuring the first SRS on the N SRS resource sets.

In a possible embodiment of the present disclosure, the first configuration message is used to indicate adjustment values for the N TAs, and the transceiver or the processor is configured to determine and update the N TAs in accordance with the adjustment values for the N TAs and the N TAs maintained by the terminal.

In a possible embodiment of the present disclosure, initial TAs of the N TAs are same.

In a possible embodiment of the present disclosure, the transceiver is further configured to perform at least one of transmitting PUSCH signal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or transmitting PUCCH signal in accordance with a TA of PUCCH, wherein the TA of the PUCCH is a TA indicated by the network side device, or a TA corresponding to an SRS associated with the PUCCH, or a TA corresponding to an antenna group for transmitting the PUCCH signal; or transmitting a second SRS in accordance with the updated TA.

In a possible embodiment of the present disclosure, the transceiver is further configured to transmit a third. SRS to the network side device on the N SRS resource sets through the N antenna groups respectively, and receive a second configuration message transmitted by the network side device, the second configuration message is used to indicate an adjustment value for a first TA, and the first TA is a TA which is determined by the network side device as having changed through measuring the third SRS on the N SRS resource sets. The transceiver or the processor is configured to determine and update the first TA in accordance with the adjustment value for the first TA and the first TA maintained by the terminal.

In still yet another aspect, the present disclosure provides in some embodiments a network side device, including a transceiver, a memory, a processor, and a program stored in the memory and capable of being executed by the processor. The transceiver is configured to measure a first SRS transmitted by a terminal on N SRS resource sets through N antenna groups respectively to determine N TAs, where N is an integer greater than 1. The transceiver is further configured to transmit a first configuration message to the terminal, the first configuration message is used to configure the N TAs, and the N TAs correspond to the N antenna groups respectively.

In a possible embodiment of the present disclosure, the first configuration message is used to indicate adjustment values for the N TAs, to enable the terminal to determine and update the N TAs in accordance with the adjustment values for the N TAs and the N TAs maintained by the terminal.

In a possible embodiment of the present disclosure, initial TAs of the N TAs are same.

In a possible embodiment of the present disclosure, the transceiver is further configured to perform at least one of: receiving PUSCH signal transmitted by the terminal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or receiving PUCCH signal transmitted by the terminal in accordance with a TA of PUCCH, wherein the TA of the PUCCH is a TA indicated by the network side device, or a TA corresponding to an SRS associated with the PUCCH, or a TA corresponding to an antenna group for transmitting the PUCCH signal; or receiving a second SRS transmitted by the terminal in accordance with the updated TA.

In a possible embodiment of the present disclosure, the transceiver is further configured to: measure a third SRS transmitted by the terminal through the N antenna groups on the N SRS resource sets to obtain an adjustment value for a first TA, wherein the first TA is a TA which is determined by the network side device as having changed through measuring the third SRS on the N SRS resource sets; and transmit a second configuration message to the terminal, the second configuration message being used to indicate the adjustment value for the first TA, to enable the terminal to determine and update the first TA in accordance with the adjustment value for the first TA and the first TA maintained by the terminal.

In still yet another aspect, the present disclosure provides in some embodiments a computer-readable storage medium storing therein a program. The program is executed by a processor, so as to implement steps of the above-mentioned TA configuration method for the terminal, or implement steps of the above-mentioned TA configuration method for the network side device.

According to the embodiments of the present disclosure, the terminal transmits the first SRS to the network side device through the N antenna groups on the N SRS resource sets respectively, where N is an integer greater than 1. Next, the terminal receives the first configuration message transmitted by the network side device, the first configuration message is used to configure the N TAs corresponding to the N antenna groups respectively, and the N TAs are obtained by the network side device through measuring the first SRS on the N SRS resource sets. Through configuring the TAs corresponding to the antenna groups respectively, it is able to provide a corresponding TA for each antenna group, thereby to improve the signal reception quality.

DETAILED DESCRIPTION

In order to make the objects, the technical solutions and the advantages of the present disclosure more apparent, the present disclosure will be described hereinafter in details in conjunction with the drawings and embodiments.

Figure 1:
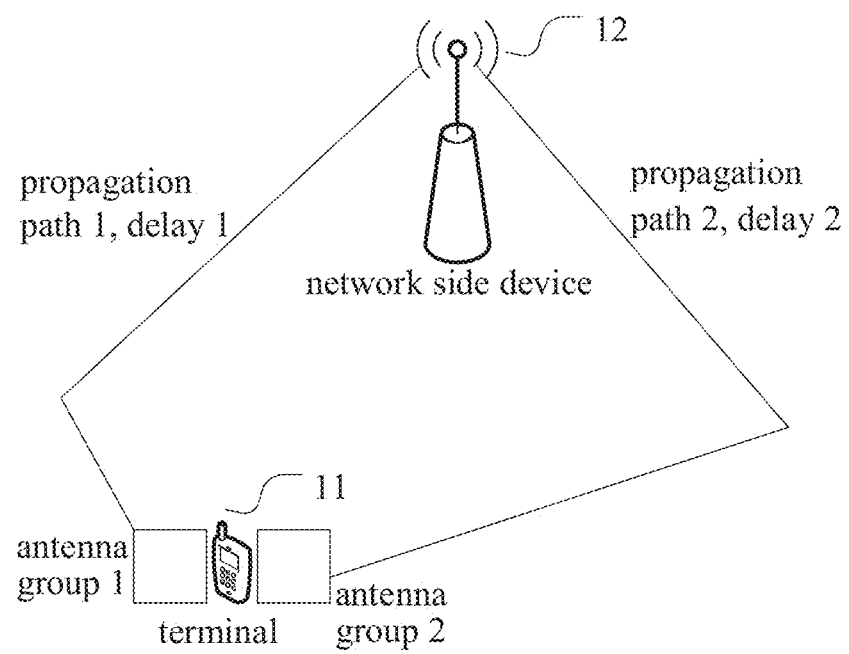
FIG. 1 is a schematic view showing an available network according to some embodiments of the present disclosure.

FIG. 1 shows an available network according to some embodiments of the present disclosure. As shown in FIG. 1, the network includes a terminal 11 and a network side device 12. The terminal 11 includes a plurality of antenna groups, an in FIG. 1, two antenna groups are taken as an example. There is a propagation path 1 between an antenna group 1 and the network side device 12 with a delay 1, and there is a propagation path 2 between an antenna group 2 and the network side device 12 with a delay 2. It should be appreciated that, in FIG. 1, two antenna groups communicate with a same network side device. However, in some embodiments of the present disclosure, the plurality of antenna groups in the terminal 11 may communicate with a same network side device 12 or a plurality of network side devices 12 simultaneously, and communication is also supported through dynamically switching the plurality of antenna groups.

Further, the terminal 11 may be a User Equipment (UE) or any other terminal device, e.g., mobile phone, tablet personal computer, laptop computer, Personal Digital Assistant (PDA), Mobile Internet Device (MID), wearable device, robot or vehicle. It should be appreciated that, a specific type of the terminal will not be particularly defined herein. The network side device 12 may be a base station a macro base station, a Long Term Evolution (LTE) evolved Node B (eNB) or a 5G New Radio (NR) NB), a micro base station (e.g., a Low Power Node (LPN), a pico base station or a femto base station), an Access Point (AP), or a network node (e.g., a Central Unit (CU) or a Transmission Reception Point (TRP). It should be appreciated that, a specific type of the network side device will not be particularly defined herein.

Figure 2:
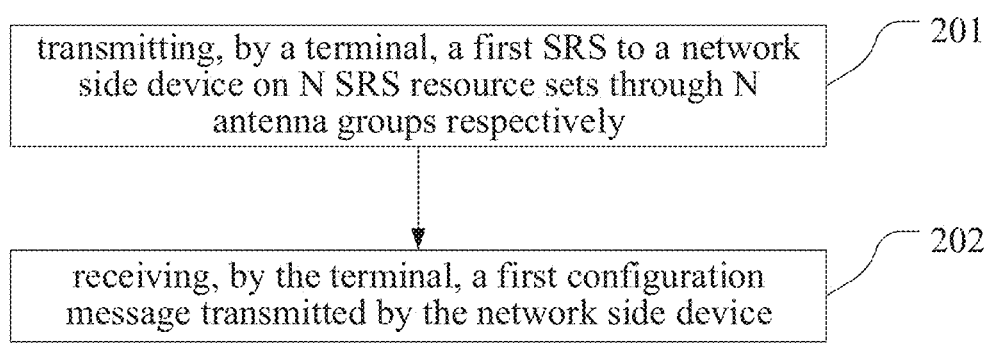
FIG. 2 is a flow chart of a TA configuration method according to some embodiments of the present disclosure.

As shown in FIG. 2, the present disclosure provides in some embodiments a TA configuration method which includes: Step 201 of transmitting, by a terminal, a first Sounding Reference Signal (SRS) to a network side device on N SRS resource sets through N antenna groups respectively, N being an integer greater than 1; and Step 202 of receiving, by the terminal, a first configuration message transmitted by the network side device, the first configuration message being used to configure N TAs, the N TAs corresponding to the N antenna groups respectively, the N TAs being obtained by the network side device through measuring the first SRS on the N SRS resource sets.

In some embodiments of the present disclosure, the antenna group may be called as an antenna panel or an antenna port group. In other words, the N antenna group may also be N antenna panels or N antenna port groups.

The N TAs correspond to the N SRS resource sets respectively. To be specific, the antenna groups correspond to the SRS resource sets respectively, so the N TAs also correspond to the N SRS resource sets respectively.

In addition, in some embodiments of the present disclosure, each TA may be provided with a TA Identifier (ID), different TAs may have different TA IDs, and one TA may also be called as a TA with a TA ID. For example, the network side device may configure a plurality of TA IDs for the terminal in Radio Resource Control (RRC) Information Element (IE) ServingCellConfig configured for the terminal, and each TA ID corresponds to a respective one antenna group or a respective one SRS resource set.

The N SRS resource sets may be configured by the network side device for the terminal, and each SRS resource set may be configured with a respective one TA ID. In this regard, when an SRS is transmitted by the terminal, each SRS resource set may be transmitted through a respective one antenna group, so as to obtain the N TAs through measurement.

The terminal may transmit the first SRS to the network side device through the N antenna groups on the N SRS resource sets respectively, so the network side device may obtain the TAs through measurement for different antenna groups (or different SRS resource sets).

It should be appreciated that, in some embodiments of the present disclosure, a mode of measuring, by the network side device, the SRS to obtain the TA will not be particularly defined, and a known mode in the protocol, or any newly-introduced mode in a subsequent protocol, may be adopted.

Through Step 201, the network side device may obtain the TAs for the plurality of antenna groups through measuring the SRS on the plurality of SRS resource sets, and indicate them to the terminal, so that the terminal may transmit a corresponding uplink signal in accordance with the indicated TAs.

In addition, when the N TAs correspond to the N antenna groups respectively, it means that each TA corresponds to a respective one antenna group. However, in actual use, values of the TAs corresponding to different antenna groups may be the same or different. For example, a value of a TA 1 corresponding to an antenna group I may be the same as, or different from, a value of a TA 2 corresponding to an antenna group 2.

In addition, the first configuration message may be an RRC message, or an MAC CE.

It should be appreciated that, when the first configuration message is used to configure the N TAs, it means that the first configuration message is used to configure values of the N TAs so as to directly update the N TAs, or used to configure an adjustment value or an offset value of each of the N TAs to enable the terminal to determine and update the values of the N TAs in accordance with the adjustment value or offset value.

It should be appreciated that, in some embodiments of the present disclosure, the TA may be represented by $N_{TA}$ or $T_{TA}$, where $T_{TA}$ may be understood as a TA value obtained after converting $N_{TA}$. A conversion relationship between $T_{TA}$ and $N_{TA}$ is known in the protocol, e.g., $T_A=(N_{TA}+N_{TAoffset})T_c$, where $T_c=1/(\Delta f_{max} \cdot N_f)$, $\Delta f_{max}=480 \cdot 10^3$ Hz, and $N_f=4096$. A value of $N_{TA,offset}$ may be defined as follows in a relevant protocol.

| Duplexing mode | $N_{TAoffset}$ |
|---|---|
| FDD in FR1 or FR2 | 0 |
| TDD in FR1 | 25560 |
| TDD in FR2 | 13763 |

It should be appreciated that, the above conversion relationship between $T_{TA}$ and $N_{TA}$ is merely for illustrative purposes, and it will not be particularly defined herein. For example, the conversion relationship between $T_{TA}$ and $N_{TA}$ may also be that newly defined a subsequent protocol.

Based on the above, in some embodiments of the present disclosure, the TA may be understood as that represented by $N_{TA}$ or $T_{TA}$. The following description will be given by taking $N_{TA}$ as an example.

Through the above steps, it is able to configure the TAs corresponding to different antenna groups, so as to ensure each antenna group to use the corresponding TA, thereby to improve the signal reception quality.

In a possible embodiment of the present disclosure, the first configuration message is used to indicate adjustment values for the N TAs, and the TA configuration method further includes determining and updating, by the terminal, the N TAs in accordance with the adjustment values for the N TAs and the N TAs maintained by the terminal.

The N TAs may be understood as N TAs with TA IDs, and the N TAs maintained by the terminal may be N TAs with TA IDs maintained by the terminal, e.g., TAs updated by the terminal for the last time before the updating, or TAs currently maintained by the terminal before the updating.

In addition, the adjustment values for the N TAs may be obtained by the network side device through measuring the first SRS on the N SRS resource sets. For example, the network side device determine the adjustment value (also called as offset value) for the TA for each antenna group, i.e., an offset value relative to a previously-measured TA, in accordance with a TA for each antenna group obtained through measuring the first SRS on the N SRS resource sets and the previously-measured TA for each antenna group.

For example, when the network side device has configured a TA ID for each SRS resource set, the network side device may determine a TA corresponding to the TA ID in accordance with each SRS resource set. When no TA ID has been configured for each SRS resource set, the network side device may determine a TA corresponding to each SRS resource set ID in accordance with each SRS resource set, so as to determine a TA corresponding to each SRS resource set (also called as a TA corresponding to each antenna group). Next, the network side device may notify the measured TA corresponding to each antenna group to the terminal, e.g., indicate a TA command corresponding to the TA II) to the terminal through an MAC CE, or notify a TA command corresponding to each SRS resource set ID to the terminal through the MAC CE. In this regard, the terminal may determine and maintain the TA corresponding to each TA ID or each SRS resource set ID (or the TA corresponding to each antenna group) in accordance with notification from the network side device.

Further, the N TAs may have a same initial TA.

The initial TA of the TA may be an initial TA value of the TA, or an initial value of an adjustment value for the TA.

For example, the TA configuration method further includes: transmitting, by the terminal, a first signal to the network side device through one or more antennas in the N antenna groups; and receiving, by the terminal, a first TA transmitted by the network side device, the first TA being obtained by the network side device through measuring the first signal, and the initial TA of the N TAs being the first TA transmitted by the network side device.

The first signal may be a Random Access Channel (RACH). It should he noted that, the first signal will not be particularly defined herein, and it may be any other uplink signal, e.g., SRS.

In addition, the one or more antennas may be one or more antennas in one or more antenna groups. For example, the terminal may transmit the RACH to the network side device through a certain antenna group. The network side device may obtain the TA for the terminal in accordance with the RACH transmitted by the terminal, and then configure the TA for the terminal in accordance with a TA command in a Random Access Response (RAR). The TA is an initial value of the TA for each antenna group.

During the implementation, the N TAs may have the same initial TA, so it is able to maintain the TAs starting from the same initial TA, thereby to reduce the complexity. It should be noted that, in some embodiments of the present disclosure, the N TAs may also have different initial TAs.

In addition, in some embodiments of the present disclosure, the N TA IDs may be N Timing Advance Sub-Group (TASG) IDs, and each TASG ID corresponds to one antenna group, The TA may also be called as a TASG, or a TA of the TASG.

The network side device may configure N TASGs for the terminal through RRC signaling, so that the terminal may maintain the TAs for the N TASGs. Each TASG may correspond to one antenna group, and the quantity of TASGs may be configured through the RRC signaling, or determined in accordance with a terminal's capability, or the report of the terminal. Each TASG is provided with an index, which is called as a TASG ID.

In some embodiments of the present disclosure, the TASG may be an antenna panel sub-group or an antenna group, i.e., it may be used to represent different antenna groups, and the antenna groups may have different TAs. The TASG ID, or an antenna panel ID or antenna group ID, is used by the terminal to differentiate the antenna groups, and the antenna groups may have different TAs.

In a possible embodiment of the present disclosure, the TA configuration method further includes at least one of; transmitting, by the terminal, PUSCH signal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or transmitting, by the terminal, PUCCH signal in accordance with a TA of PUCCH, Wherein the TA of the PUCCH is a TA indicated by the network side device, or a TA corresponding to an SRS associated with the PUCCH, or a TA corresponding to an antenna group for transmitting the PUCCH signal; or transmitting, by the terminal, a second SRS in accordance with the updated TA.

In the case that the TA of the PUSCH is the TA indicated by the network side device, the TA indicated by the network side device may be a TA in the N TAs that is indicated to the PUSCH. For example, for the PUSCH, the network side device may configure the TASG ID of the PUSCH through Downlink Control information (DCI).

Further, the TASG ID of the PUSCH may be configured in the DCI. For example, as a possible scheme, the DCI is provided with merely one TASG ID i.e., $N_{TA}$ indicated by the TASG ID field has a same value for all transmission blocks. As another possible scheme, the DCI is provided with one TASG ID field for each transmission block, i.e., $N_{TA}$ has different values for the transmission blocks. This is because when the transmission is performed simultaneously through a plurality of antenna groups, different transmission blocks may be adopted for each antenna group, and at this time the TA for each transmission block may be different.

In addition, in the above embodiments of the present disclosure, the TASG ID may also be obtained through an associated pilot signal (e.g., an SRS), and then the TA may be determined in accordance with the TASG ID. For example, when the pilot signal associated with the TA is an SRS, e.g., an SRS indicated through an SRS Resource Indicator (SRI) or a Quasi-colocation (QCL) pilot signal indicated through a Transmission Configuration Indication (TCI), the TASG ID of the PUSCH may be the same as a TASG ID configured for the SRS, and at this time the TASG IDs may not be indicated independently.

It should be appreciated that, the above description has been given merely when the TA ID is a TASG ID, but the TA ID will not be particularly defined herein.

In the case that the TA of the PUCCH is the TA indicated by the network side device, the TA indicated by the network side device may be a TA in the N TAs that is indicated to the PUCCH. For example, for the PUCCH, the TASG ID may be configured through high layer signaling or physical layer information, and the terminal may determine the TA in accordance with the TASG When the TASG ID is configured through an RRC IE, a respective one TASG ID is configured for each PUCCH-ResourceSet as follows:

```
PUCCH-ResourceSet ::=        SEQUENCE {
    pucch-ResourceSetId          PUCCH-ResourceSetId,
    resourceList                 SEQUENCE (SIZE
(1..maxNrofPUCCH-ResourcesPerSet)) OF PUCCH-ResourceId,
    maxPayloadMinus1             INTEGER (4..256)
    tasg-Id                      TASG-Id,
}.
```

Alternatively, a respective one TASG ID is configured for each PUCCH-Resource as follows:

```
PUCCH-Resource ::=           SEQUENCE {
    pucch-ResourceId             PUCCH-ResourceId,
    startingPRB                  PRB-Id,
    intraSlotFrequencyHopping    ENUMERATED { enabled }
    secondHopPRB                 PRB-Id
    format                       CHOICE {
```

-continued

```
    format0                       PUCCH-format0,
    format1                       PUCCH-format1,
    format2                       PUCCH-format2,
    format3                       PUCCH-format3,
    format4                       PUCCH-format4
}
tasg-Id                           TASG-Id,
}.
```

When the TA is indicated through the DCI, in a standard protocol, PUCCH resource is indicated through PUCCH. resource indicator in DCI formats 1_0 and 1_1. In order to indicate a TA for transmitting the PUCCH, in some embodiments of the present disclosure, an indicator of the PUCCH TASG-ID (PUCCH tasg indicator) may be added in the DC 1 to indicate the TA for transmitting the PUCCH.

In the Format 1_0 or Format 1_1, the PUCCH resource indicator may have 3 bits while the PUCCH tasg indicator may have 2 bits. It should be noted that, the quantity of bits will not be particularly defined herein.

When the terminal transmits the second SRS in accordance with the updated TA, the terminal may transmit a corresponding SRS in accordance with an updated value of the TA corresponding to the SRS. For example, upon the receipt of the TA command in the MAC CE, the terminal may transmit the SRS in accordance with the updated TA.

It should be appreciated that, in some embodiments of the present disclosure, the first SRS and the second SRS, as well as a subsequently-mentioned third SRS, may be the same or different. The words "first", "second" and "third" are used to differentiate the SRSs transmitted in different time units. The time unit may be a subframe, a slot or a symbol, which will not be particularly defined herein.

In the above embodiments of the present disclosure, when the TA ID for transmitting the PUCCH is indicated by the network side device to the terminal, the terminal may determine the TA for transmitting the PUSCH in accordance with the indicated TA ID, When no TA ID for transmitting the PUSCH is indicated to the terminal by the network side device, the terminal may determine the TA for transmitting the PUSCH in accordance with a TA ID, an SRS resource set ID or an antenna group corresponding to an SRS associated with the PUSCH.

When the TA ID for transmitting the PUCCH is indicated by the network side device to the terminal, the terminal may determine the TA for transmitting the PUCCH in accordance with the indicated TA ID. When no TA ID for transmitting the PUCCH is notified by the network side device to the terminal, the terminal may determine that the antenna group for transmitting the PUCCH is identical to an antenna group for transmitting which one of the SRS resource set, and then determine the TA in accordance with an SRS resource set ID. When the terminal cannot determine a corresponding SRS resource set ID or the terminal has not transmitted an SRS or the terminal has not obtained a TA command corresponding to the SRS resource set yet, the terminal may transmit the PUCCH using a TA indicated by a Timing Advance Group (GAG) MAC CE from the network side device.

The above implementation modes will be described illustratively hereinafter in conjunction with FIG. 3.

Figure 3:
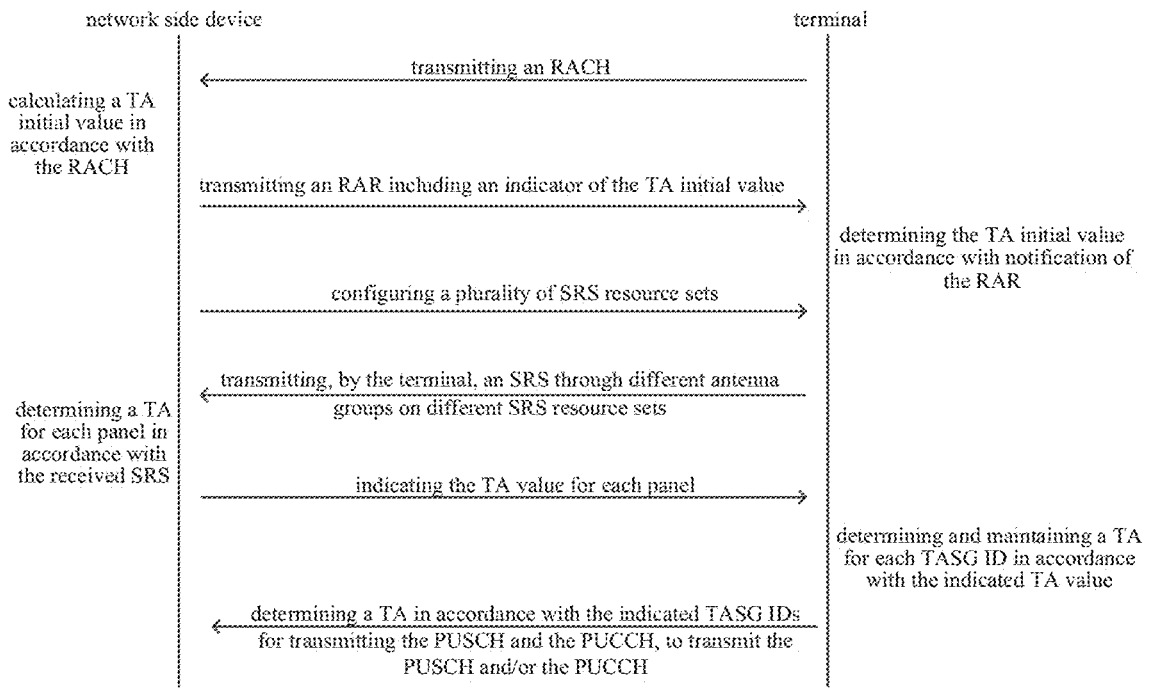
FIG. 3 is a schematic view showing an instance for configuring a TA according to some embodiments of the present disclosure.

As shown in FIG. 3, the terminal transmits an RACH to the network side device, and the network side device calculates a TA initial value, i.e., an initial value of an adjustment value for each of N TA IDs (or TASG IDs) in accordance with the RACH. It should be noted that, the network side device may also calculate a TA initial value of each of the N TA IDs.

The network side device may transmit an initiator indicating the TA initial value through an RAR.

In accordance with the RAR, the terminal may determine the TA initial value, i.e., determine the initial value of the adjustment value for each of the N TA IDs (or TASG IDs), or determine the TA initial value of each of the NTA IDs.

The network side device may configure a plurality of SRS resource sets for the terminal.

The terminal may transmit an SRS through different antenna groups on different SRS resource sets.

The network side device may determine an adjustment value (a TA value) for the TA for each antenna group in accordance with the received SRS.

The network side device may indicate the TA value for each antenna group to the terminal.

In accordance with the indicated TA value, the terminal may maintain the TA corresponding to each TA ID (or TASG ID), i.e., determine and update the TA corresponding to each TA ID (or TASG ID).

Next, the terminal may determine a TA in accordance with the indicated TA IDs (or TASG IDs) for transmitting the PUSCH and the PUCCH, and then transmit the PUSCH and/or the PUCCH.

In a possible embodiment of the present disclosure, the TA configuration method further includes: transmitting, by the terminal, a third SRS to the network side device on the N SRS resource sets through the N antenna groups respectively; receiving, by the terminal, a second configuration message transmitted by the network side device, the second configuration message being used to indicate an adjustment value for a first TA, wherein the first TA is a TA which is determined by the network side device as having changed through measuring the third SRS on the N SRS resource sets; and determining and updating, by the terminal, the first TA in accordance with the adjustment value for the first TA and the first TA maintained by the terminal.

There may exist one or more first TAs. For example, when it detects through measurement that a plurality of TAs has changed, the network side device may configure an adjustment value for each TA through the second configuration message.

During the implementation, merely the adjustment value for the TA which has changed may be configured, so it is able to reduce configuration overhead. To be specific, it may be applied to a scenario where the N TAs are updated subsequent to configuring the N TAs in Step 201.

Further, the first TA may be a TA of the PUSCH, and the first TA maintained by the terminal may be a TA maintained by the terminal and corresponding to the SRS associated with the PUSCH.

The TA corresponding to the SRS associated with the PUSCH may be a TA corresponding to an SRS resource set or an antenna group corresponding to the SRS associated with the PUSCH.

It should be noted that, the first TA may also be a TA of the PUCCH, which will not be particularly defined herein.

The TA configuration method will be described illustratively hereinafter in conjunction with the following three embodiments.

First Embodiment

In this embodiment, a TA $N_{TA}$ for transmitting an uplink signal through different antenna groups is configured through high layer signaling as follows.

A TASG is configured for the terminal through RRC signaling. The terminal may maintain TAs of a plurality of TASGs, and each TASG may correspond to a respective one antenna group. The quantity of TASGs may be configured through the RRC signaling, or determined in accordance with a terminal's capability, or determined according to the report of the terminal. Each TASG is provided with an index, which is called as TASG ID.

The TASG in this embodiment may refer to that mentioned hereinabove, and thus will not be particularly defined herein.

A TASG configuration may be added in an RRC configuration. An illustrative but non-restrictive instance is described as follows:

```
ServingCellConfig ::=      SEQUENCE {
tag-Id                     TAG-Id,
tasg                       SEQUENCE (SIZE
(1..maxNrofTASGs)) OF TASG-Id
}
TASG-Id ::=                INTEGER (0..maxNrofTASGs-1).
```

The quantity of TASGs is associated with the quantity of antenna groups for the terminal, and maxNrofTASGs=4.

The terminal may transmit the RACH to the network side device through a certain antenna group. The network side device may obtain the TA for the terminal through measuring the RACH from the terminal, and a base station may configure the TA for the terminal in accordance with a TA command in the RAR. The TA is an initial value of a TA for each antenna group.

The base station may configure a plurality of SRS resource sets for the terminal, and configure a respective one TASG ID for each SRS resource set. The terminal may transmit the SRS resource sets through different antenna groups, The base station may receive each SRS resource set, obtain the TA corresponding to each TASG ID through measurement, and determine an adjustment value for the TA for each antenna group in accordance with the TA corresponding to each TASG ID and a previously-measured TA for each antenna group (an initial value of the TA for each antenna group may be a TA obtained through measuring the RACH).

Each TASG command word is configured through an MAC CE. An MAC layer may configure the TA corresponding to each TASG ID through a TA command MAC CE. Upon the receipt of the MAC CE, the terminal may determine the TA for each TASG.

The MAC CE may update the TAs for all the TASGs once or update the TAs for a part of the TASGs, and at this time the TA for each TASG may be expressed as $N_{TA\_new}=N_{TA\_old}+(T_A-k)\cdot 16\cdot 64/2^\mu$, where $N_{TA\_old}$ represents a TA maintained by the TASG, $N_{TA\_now}$ represents an updated TA for the TASG, $T_A$ represents an adjustment value, a value of k is associated with the quantity of bits in a TA field and it may be expressed as any one of $$k = 2^{NrOfTaBits}/2 - 1$$
$$k = 2^{NrOfTaBits-1} - 1$$
$$k = 2^{NrOfTaBits}/2$$, and
$$k = 2^{NrOfTaBits-1}$$

NrOfTaBits represents the quantity of bits in the TA field. For example, when the quantity of bits in the TA field is 6, k may be 31 or 32, and when the quantity of bits in the TA field is 5, k may be 15 or 16.

it should be appreciated that, the adjustment value represented by $T_A$ is merely for illustrative purposes, and in some embodiments of the present disclosure, the adjustment value configured by the network side device may also be $(T_A-k)\cdot 16\cdot 64/2^\mu$. In addition, in the above equation may be understood as an adjustment value for the TA when $T_A$ is converted into $N_{TA}$. In some embodiments of the present disclosure, a mode of converting $T_A$ into $N_{TA}$ will not be particularly defined herein, e.g., a known conversion relationship in the protocol or a newly-defined conversion relationship in a subsequent protocol may be adopted.

Figure 4:
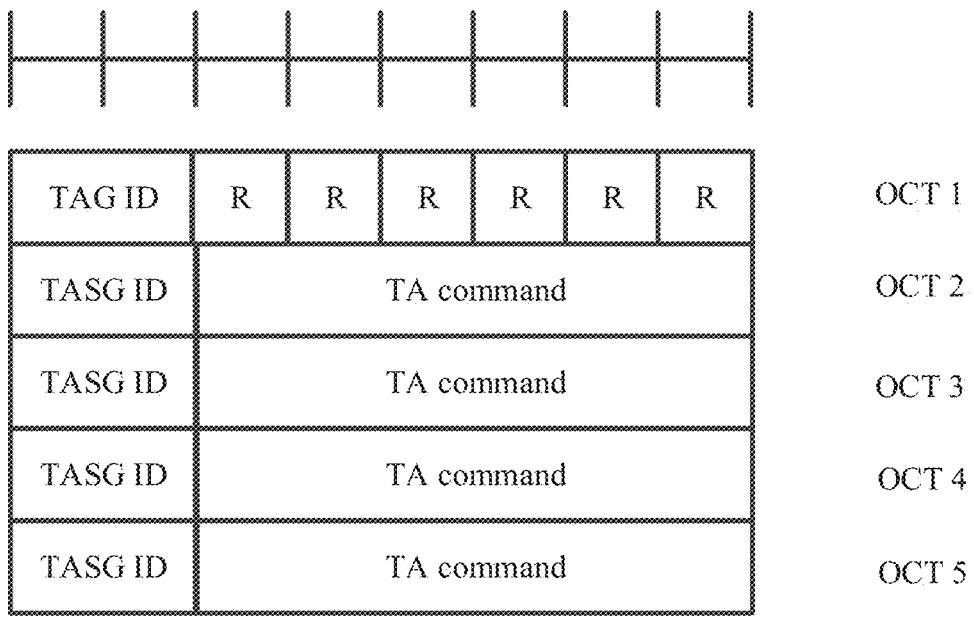
FIG. 4 is a schematic view showing a Medium Access Control (MAC) Control Element (CE) according to some embodiments of the present disclosure.

In addition, a format of the MAC CE is shown in FIG. 4.

The TAs for the PUSCH, the PUCCH and the SRS as well as the transmission thereof may refer to those mentioned hereinabove, and thus will not be particularly defined herein.

Second Embodiment

In this embodiment, the TAs for different SRS resource sets may be configured through high layer signaling (e.g., RRC IE or MAC CE), and the SRS resource set IDs may be used to differentiate the antenna groups.

The terminal may transmit the RACH to the network side device through a particular antenna group. The base station may obtain the TA for the terminal through measuring the RACH from the terminal, and the network side device may configure the TA for the terminal in accordance with a TA command in the RAR. The TA is an initial value of the TA for each antenna group.

The network side device may configure a plurality of SRS resource sets for the terminal, and the terminal may transmit the SRS resource sets through different antenna groups. The network side device may receive each SRS resource set, obtain the TA corresponding to each SRS resource set through measurement, and determine an adjustment value for the TA for each SRS resource set in accordance with the TA corresponding to each SRS resource set and a previously-measured TA for each SRS resource set (an initial value of the TA for each SRS resource set may he a TA obtained through measuring the RACH).

When the network side device has detected that there is an offset for the TA for a certain SRS resource set, it needs to notify a TA offset value corresponding to the SRS resource set through high layer signaling.

First scheme: configuring through an MAC CE.

Figure 5:
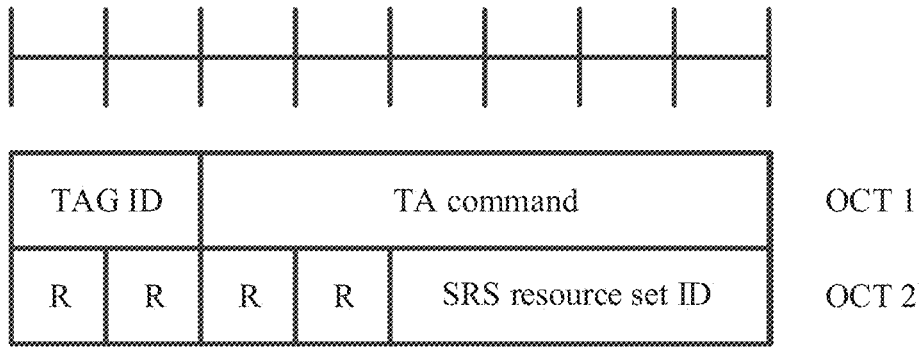
FIG. 5 is another schematic view showing the MAC CE according to some embodiments of the present disclosure.
Figure 6:
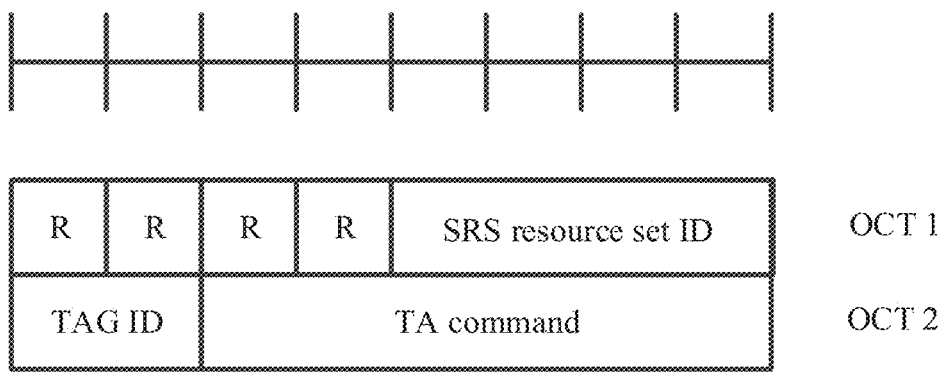
FIG. 6 is yet another schematic view showing the MAC CE according to some embodiments of the present disclosure.

A TA command is configured through the MAC CE fir each SRS resource set, and FIG. 5 or FIG. 6 shows the MAC CE.

Upon the receipt of the MAC CE, the terminal may determine the transmission TA for the antenna group corresponding to the SRS resource set.

Second scheme: configuring through an RRC IE as follows.

```
SRS-TA-Config ::=               SEQ terminal NCE {
  srs-ResourceSetId               SEQ terminal NCE
(SIZE(1..maxNrofSRS-ResourceSets)) OF SRS-ResourceSetId
  srs-TimingAdvance               SEQ terminal NCE
(SIZE(1..maxNrofSRS-ResourceSets)) OF TimingAdvanceCommand
}
TimingAdvanceCommand::=         INTEGER (0..63).
```

Upon the receipt of the RRC Information Element (IE). the terminal may determine the TA corresponding to the antenna group for transmitting the SRS resource set.

For the PUSCH, the TA may be obtained through an associated SRS resource set D.

For the PUCCH, the terminal may determine that the antenna group for transmitting the PUCCH is identical to an antenna group for transmitting which one of the SRS resource sets, so as to determine the TA. When the terminal cannot determine a corresponding SRS resource set ID or the terminal has not transmitted the SRS or the terminal has not obtained a TA command corresponding to the SRS resource set, the terminal may transmit the PUCCH using a TA indicated by a TAG MAC CE.

Third Embodiment

In this embodiment, the adjustment value for the TA of the PUSCH may be indicated through physical layer signaling, e.g., DCI.

A TA field is added in the DCI to indicate an offset value of the TA of the PUSCH relative to a TA of an associated pilot signal.

The terminal may transmit the RACH to the base station through a certain antenna group. The network side device may obtain the TA for the terminal through measuring the RACH transmitted from the terminal, and configure the TA for the terminal through a TA command in the RAR. The TA is an initial value.

The network side device may configure a plurality of SRS resource sets for the terminal, and transmit the SRS corresponding to each SRS resource set through different antenna groups. The network side device may receive the SRS through each SRS resource se, and obtain the TA corresponding to each SRS resource set through measurement. When the TA obtained by the network side device through measuring the received SRS has changed, the network side device needs to notify that PUSCH timing delay associated with the PUSCH has changed. A TA field is added in the DCI to indicate an adjustment value of the TA of the PUSCH relative to the TA of the associated pilot signal. Upon the receipt of information in the DCI, the terminal may determine the TA of the PUSCH in accordance with the TA corresponding to the SRS and the adjustment value for the TA indicated in the DCI, i.e., $N_{TA\_PUSCH} = N_{TA\_associatedSRS} + (T_A - k) \cdot 16 \cdot 64/2^\mu$, where a value of k is mentioned hereinabove, $N_{TA\_associatedSRS}$ represents an associated pilot signal SRS, $N_{TA\_PUSCH}$ represents the TA of the PUSCH, and $T_A$ represents the adjustment value.

Identically, the adjustment value represented by $T_A$ is merely for illustrative purposes, and in some embodiments of the present disclosure, the adjustment value configured by the network side device may also be $(T_A - k) \cdot 16 \cdot 64/2^\mu$. In addition, the description about in the above equation may refer to that mentioned hereinabove, and thus will not be particularly defined herein.

As a possible scheme, there is merely one TA field in the DCI; i.e., $N_{TA}$ indicated by the TA field has a same value for all transmission blocks. As another possible scheme, each transmission block of the DCI is provided with one TA field, i.e., $N_{TA}$ of each transmission block has a different value. This is because when the transmission is performed simultaneously through a plurality of antenna groups, a respective different transmission block may be adopted for each antenna group, and at this time the TA for each transmission block may be different.

For the PUCCH, the terminal may determine whether the same antenna group as that for a PUCCH transmission is used when transmitting the PUSCH, If so, the same TA as that of the PUSCH may be adopted; otherwise, the TA of the PUCCH may remain unchanged.

In some embodiments of the present disclosure, when there exists a plurality of antenna groups for the terminal, different antenna groups correspond to different TAs, and different TAs may be indicated to respective uplink signals. To be specific, the network side device may configure different TASGs for the terminal, and indicate the TA of each TASG through the MAC CE. The terminal may determine the TA of each TASG through the MAC CE. The network side device may configure a TASG ID for each of the PUSCH and the PUCCH, and the terminal may determine the TA for transmitting the each of the PUSCH and the PUCCH in accordance with the TASG ID. The network side device may configure the TAs for different SRS resource sets through the MAC C.E. and the terminal may determine the TAs for transmitting the PUSCH and the PUCCH in accordance with a corresponding SRS resource set ID. The network side device may indicate the TA of the PUSCH through the DCI.

In some embodiments of the present disclosure, it is able to support the indication of a plurality of TAs for a plurality of antenna groups, so as to improve the data reception quality.

Figure 7:
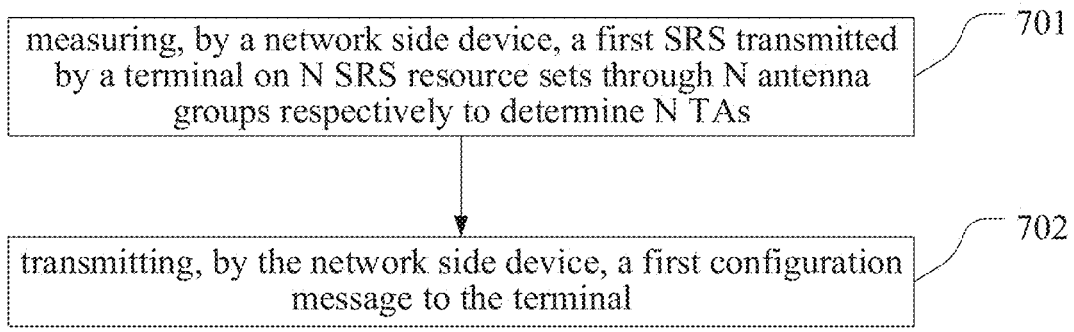
FIG. 7 is another flow chart of the TA configuration method according to some embodiments of the present disclosure.

As shown in FIG. 7, the present disclosure provides in some embodiments a TA configuration method which includes: Step 701 of measuring, by a network side device, a first SRS transmitted by a terminal on N SRS resource sets through N antenna groups respectively to determine N TAs, N being an integer greater than 1; and Step 702 of transmitting, bye the network side device, a first configuration message to the terminal, the first configuration message being used to configure the N TAs, and the N TAs corresponding to the N antenna groups respectively.

In a possible embodiment of the present disclosure, the N TAs correspond to the N SRS resource sets respectively.

In a possible embodiment of the present disclosure, the first configuration message is used to indicate adjustment values for the N TAs, to enable the terminal to determine and update the N TAs in accordance with the adjustment values for the N TAs and the N TAs maintained by the terminal.

In a possible embodiment of the present disclosure, initial TAs of the N TAs are same.

In a possible embodiment of the present disclosure, the TA configuration method further includes: measuring, by the network side device, a first signal transmitted by the terminal through one or more antennas in the N antenna groups to determine a first TA; and transmitting, by the network side device, the first TA to the terminal, the initial TA of the N TAs being the first TA transmitted by the network side device.

In a possible embodiment of the present disclosure, the TA configuration method further includes at least one of: receiving, by the network side device, PUSCH signal transmitted by the terminal in accordance with a TA of PUSCH, wherein the TA of the PUSCH is a TA indicated by the network side device, or a TA corresponding to an SRS associated with the PUKE, or a TA corresponding to an antenna group for transmitting the PUSCH signal; or receiving, by the network side device, PUCCH signal transmitted by the terminal in accordance with a TA of PUCCH, wherein the TA of the PUCCH is a TA indicated by the network side device, or a TA corresponding to an SRS associated with the PUCCH, or a TA corresponding to an antenna group for transmitting the PUCCH signal; or receiving, by the network side device, a second SRS transmitted by the terminal in accordance with the updated TA.

In a possible embodiment of the present disclosure, in the case that the TA of the PUSCH is the TA indicated by the network side device, the TA indicated by the network side device is one of the N TAs that corresponds to the PUSCH; and/or in the case that the TA of the PUCCH is the TA indicated by the network side device, the TA indicated by the network side device is one of the N TAs that corresponds to the PUCCH.

In a possible embodiment of the present disclosure, the TA configuration method further includes: measuring, by the network side device, a third SRS transmitted by the terminal through the N antenna groups on the N SRS resource sets respectively to obtain an adjustment value for a first TA, wherein the first TA is a TA which is determined by the network side device as having changed through measuring the second SRS on the N SRS resource sets; and transmitting, by the network side device, a second configuration message to the terminal, the second configuration message being used to indicate the adjustment value for the first TA, to enable the terminal to determine and update the first TA in accordance with the adjustment value for the first TA and the first TA maintained by the terminal.

In a possible embodiment of the present disclosure, the first TA is a TA of the PUSCH, and the first TA maintained by the terminal is a TA corresponding to an SRS associated with the PUSCH and maintained by the terminal.

It should be appreciated that, the implementation of the TA configuration method for the network side device may refer to relevant description about the TA configuration method for the terminal in FIG. 2 with a same beneficial effect, which will thus not be further particularly defined herein.

Figure 8:
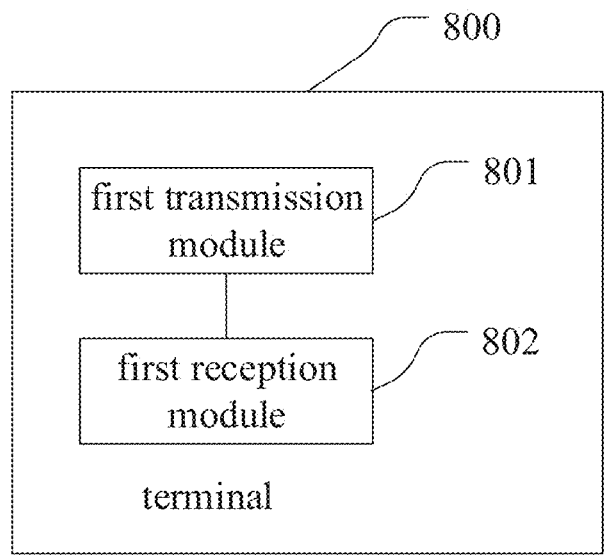
FIG. 8 is a schematic view showing a terminal according to some embodiments of the present disclosure.

As shown in FIG. 8, the present disclosure provides in some embodiments a terminal 800. which includes: a first transmission module 801 configured to transmit a first SRS to a network side device on N SRS resource sets through N antenna groups respectively, N being an integer greater than 1; and a first reception module 802 configured to receive a first configuration message transmitted by the network side device, the first configuration message being used to configure N TAs, the N TAs corresponding to the N antenna groups respectively, N being an integer greater than 1.

In a possible embodiment of the present disclosure, the N TAs correspond to the N SRS resource sets respectively.

Figure 9:
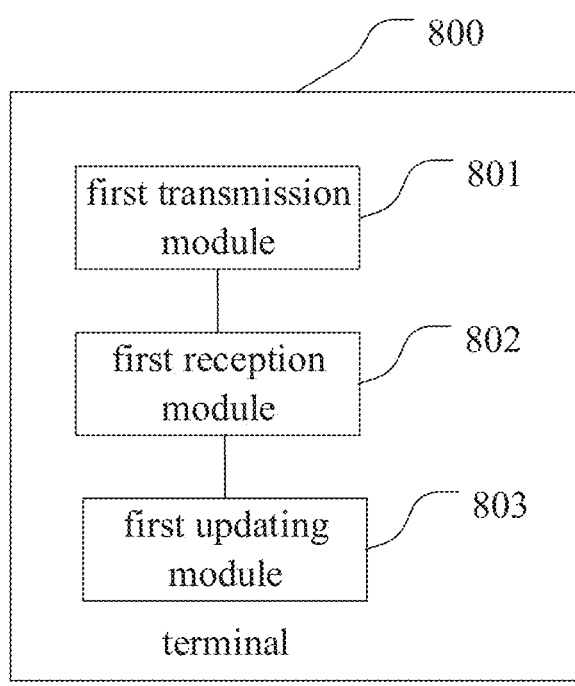
FIG. 9 is another schematic view showing the terminal according to some embodiments of the present disclosure.

In a possible embodiment of the present disclosure, the first configuration message is used to indicate adjustment values for the N TAs. As shown in FIG. 9, the terminal 800 further includes a first updating module 803 configured to determine and update the N TAs in accordance with the adjustment values for the N TAs and the N TAs maintained by the terminal.

In a possible embodiment of the present disclosure, initial TAs of the N TAs are same.

Figure 10:
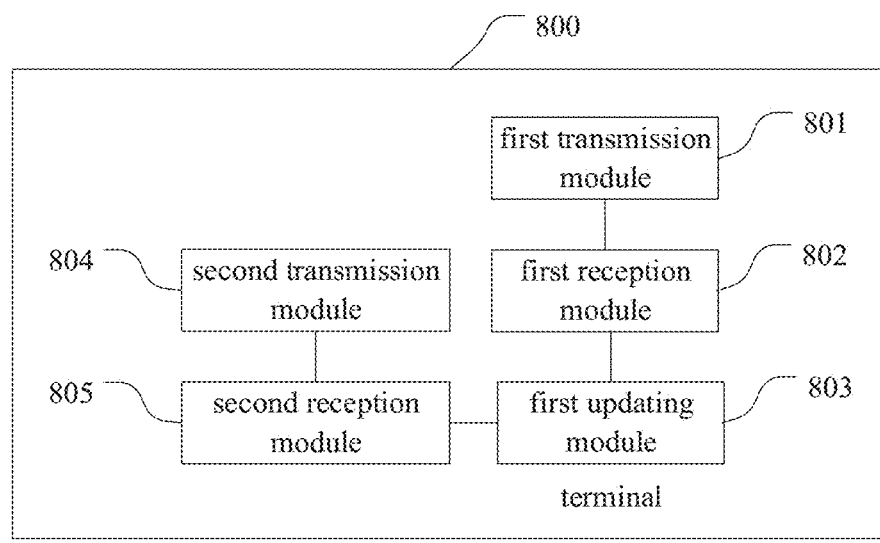
FIG. 10 is yet another schematic view showing the terminal according to some embodiments of the present disclosure.

In a possible embodiment of the present disclosure, as shown in FIG. 10, the terminal 800 further includes: a second transmission module 804 configured to transmit a first signal to the network side device through one or more antennas in the N antenna groups; and a second reception module 805 configured to receive a first TA transmitted by the network side device, the first TA being obtained by the network side device through measuring the first signal, and the initial TA of the N TAs being the first TA transmitted by the network side device.

Figure 11:
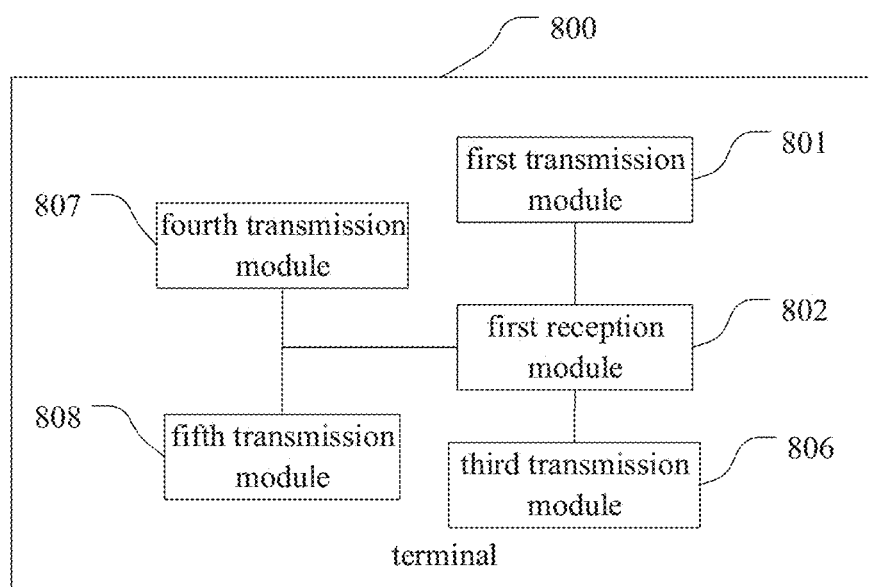
FIG. 11 is still yet another schematic view showing the terminal according to some embodiments of the present disclosure.

In a possible embodiment of the present disclosure, as shown in FIG. 11, the terminal 800 further includes at least one of: a third transmission module 806 configured to transmit PUSCH signal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or a fourth transmission module 807 configured to transmit PUCCH signal in accordance with a TA of PUCCH, wherein the TA of the PUCCH is a TA indicated by the network side device, or a TA corresponding to an SRS associated with the PUCCH, or a TA corresponding to an antenna group for transmitting the PUCCH signal; or a fifth transmission module 808 configured to transmit a second SRS in accordance with the updated TA.

In a possible embodiment of the present disclosure, in the case that the TA of the PUSCH is the TA indicated by the network side device, the TA indicated by the network side device is one of the N TAs that corresponds to the PUSCH; and/or in the case that the TA of the PUCCH is the TA indicated by the network side device, the TA indicated by the network side device is one of the N TAs that corresponds to the PUCCH.

Figure 12:
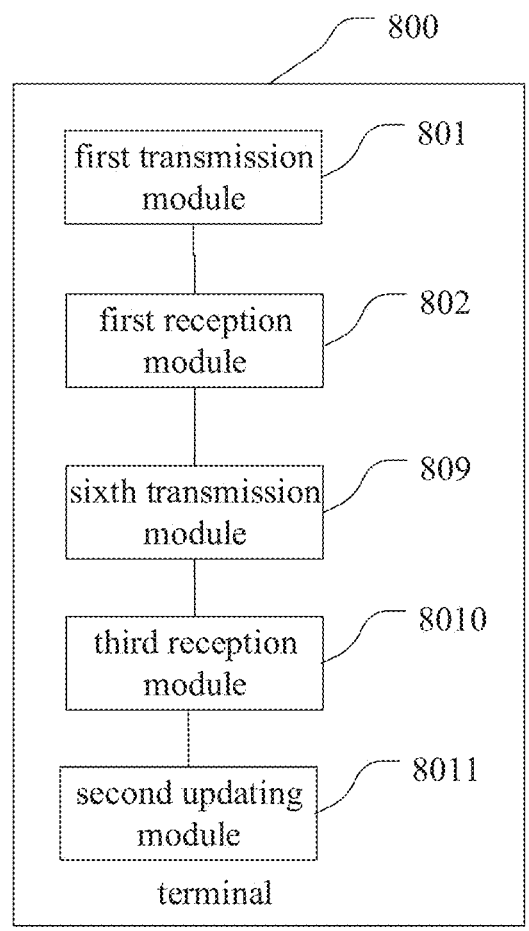
FIG. 12 is still yet another schematic view showing the terminal according to some embodiments of the present disclosure.

In a possible embodiment of the present disclosure, as shown in FIG. 12, the terminal 800 further includes: a sixth transmission module 809 configured to transmit a third SRS to the network side device on the N SRS resource sets through the N antenna groups respectively; a third reception module 8010 configured to receive a second configuration message transmitted by the network side device, the second configuration message being used to indicate an adjustment value for a first TA, wherein the first TA is a TA which is determined by the network side device as having changed through measuring the third SRS on the N SRS resource sets; or a second updating module 8011 configured to determine and update the first TA in accordance with the adjustment value for the first TA and the first TA maintained by the terminal.

In a possible embodiment of the present disclosure, the first TA is a TA of the PUSCH, and the first TA maintained by the terminal is a TA corresponding to an SRS associated with the PUSCH and maintained by the terminal.

It should be appreciated that, the terminal 800 may be a terminal in the above-mentioned TA configuration method, and the implementation of the terminal 800 may refer to that of the TA configuration method for the terminal with a same beneficial effect, which will thus not be further particularly defined herein.

Figure 13:
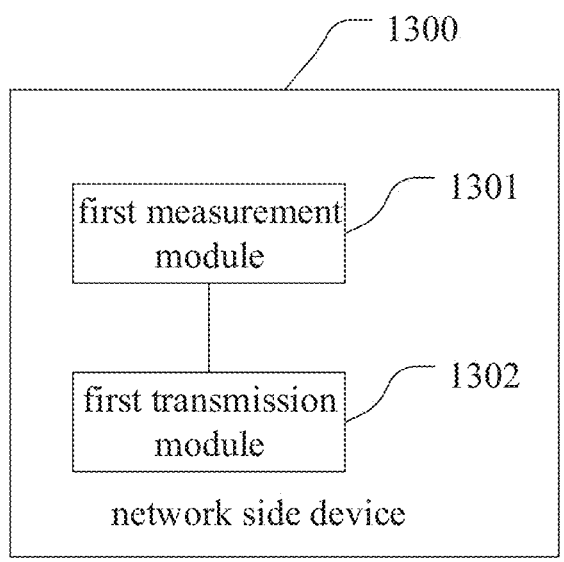
FIG. 13 is a schematic view showing a network side device according to some embodiments of the present disclosure.

As shown in FIG. 13, the present disclosure provides in some embodiments a network side device 1300 which includes: a first measurement module 1301 configured to measure a first SRS transmitted by a terminal on N SRS resource sets through N antenna groups respectively to determine N TAs, N being an integer greater than 1; and a first transmission module 1302 configured to transmit a first configuration message to the terminal, the first configuration message being used to configure the N TAs, and the N TAs corresponding to the N antenna groups respectively, N being an integer greater than 1.

In a possible embodiment of the present disclosure, the N TAs correspond to the N SRS resource sets respectively.

In a possible embodiment of the present disclosure, the first configuration message is used to indicate adjustment values for the N TAs, to enable the terminal to determine and update the N TAs in accordance with the adjustment values for the N TAs and the N TAs maintained by the terminal.

Figure 14:
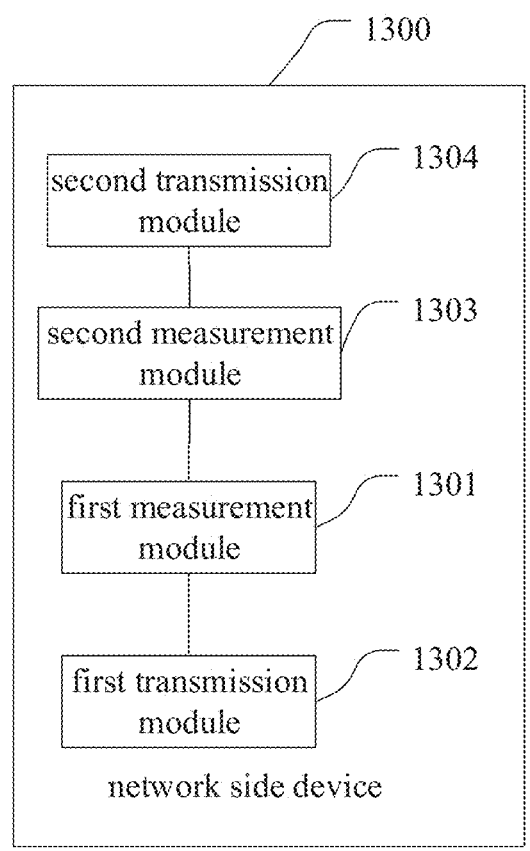
FIG. 14 is another schematic view showing the network side device according to some embodiments of the present disclosure.

In a possible embodiment of the present disclosure, initial TAs of the N TAs are same.

in a possible embodiment of the present disclosure, as shown in FIG. 14, the network side device 1300 further includes: a second measurement module 1303 configured to measure a first signal transmitted by the terminal through one or more antennas in the N antenna groups to determine a first TA; and a second transmission module 1304 configured to transmit the first TA to the terminal, the initial TA of the N TAs being the first TA transmitted by the network side device.

Figure 15:
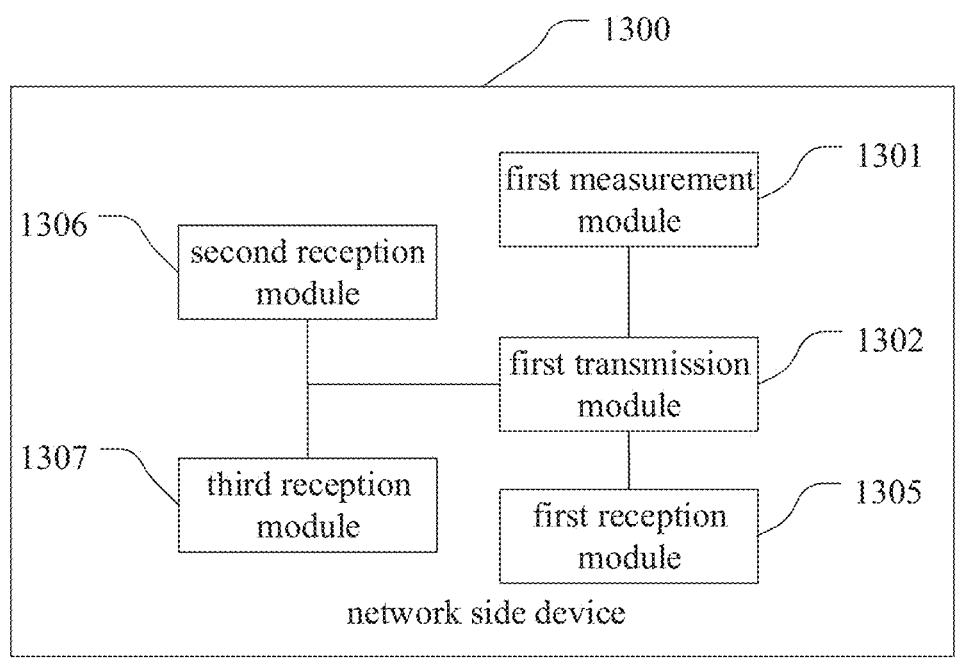
FIG. 15 is yet another schematic view showing the network side device according to some embodiments of the present disclosure.

In a possible embodiment of the present disclosure, as shown in FIG. 15, the network side device 1300 further includes at least one of: a first reception module 1305 configured to receive PUSCH signal transmitted by the terminal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or a second reception module 1306 configured to receive PUCCH signal transmitted by the terminal in accordance with a TA of PUCCH, wherein the TA of the PUCCH is a TA indicated by the network side device, or a TA corresponding to an SRS associated with the PUCCH, or a TA corresponding to an antenna group for transmitting the PUCCH signal: or a third reception module 1307 configured to receive a second SRS transmitted by the terminal in accordance with the updated TA.

In a possible embodiment of the present disclosure, in the case that the TA of the PUSCH is the TA indicated by the network side device, the TA indicated by the network side device is one of the N TAs that corresponds to the PUSCH; and/or in the case that the TA of the PUCCH is the TA indicated by the network side device, the TA indicated by the network side device is one of the N TAs that corresponds to the PUCCH.

Figure 16:
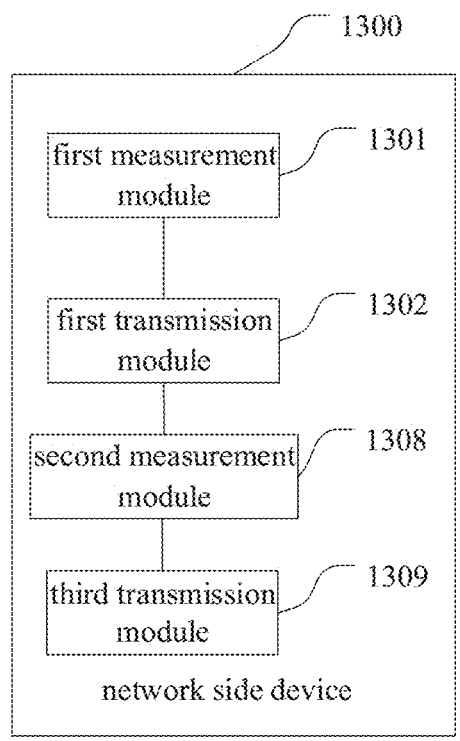
FIG. 16 is still yet another schematic view showing the network side device according to some embodiments of the present disclosure.

In a possible embodiment of the present disclosure, as shown in FIG. 16, the network side device 1300 further includes: a second measurement module 1308 configured to measure a third SRS transmitted by the terminal through the N antenna groups on the N SRS resource sets respectively to obtain an adjustment value for a first TA, wherein the first TA is a TA which is determined by the network side device as having changed through measuring the third SRS on the N SRS resource sets; and a third transmission module 1309 configured to transmit a second configuration message to the terminal, the second configuration message being used to indicate the adjustment value for the first TA, to enable the terminal to determine and update the first TA in accordance with the adjustment value for the first TA and the first TA maintained by the terminal.

In a possible embodiment of the present disclosure, the first TA is a TA of the PUSCH, and the first TA maintained by the terminal is a TA corresponding to an SRS associated with the PUSCH and maintained by the terminal.

It should he appreciated that, the network side device 1300 may be a network side device in the above-mentioned TA configuration method, and the implementation of the network side device 1300 may refer to that of the TA configuration method for the network side device with a same beneficial effect, which will thus not be further particularly defined herein.

Figure 17:
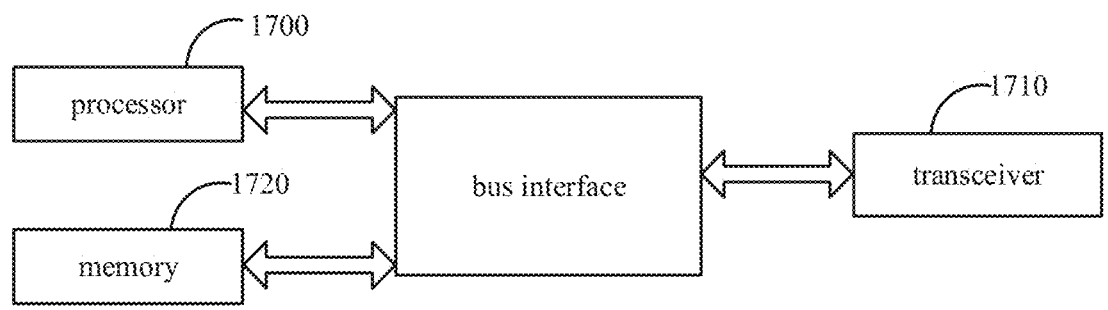
FIG. 17 is still yet another schematic view showing the terminal according to some embodiments of the present disclosure.

As shown in FIG. 17, the present disclosure provides in some embodiments a terminal which includes a transceiver 1710, a memory 1720, a processor 1700, and a program stored in the memory 1720 and executed by the processor 1700. The transceiver 1710 is configured to transmit a first SRS to a network side device on N SRS resource sets through N antenna groups respectively, N being an integer greater than 1. The transceiver 1710 is further configured to receive a first configuration message transmitted by the network side device, the first configuration message is used to configure N TAs, the N TAs corresponding to the N antenna groups respectively, and the N TAs are obtained by the network side device through measuring the first SRS on the N SRS resource sets.

The transceiver 1710 is configured to receive and transmit data under the control of the processor 1700.

In FIG. 17, bus architecture may include a number of buses and bridges connected to each other, so as to connect various circuits for one or more processors 1700 and one or more memories 1720. In addition, as is known in the art, the bus architecture may be used to connect any other circuits, such as a circuit for a peripheral device, a circuit for a voltage stabilizer and a power management circuit. A bus interface may be provided, and the transceiver 1710 may include a plurality of elements, i.e., a transmitter and a receiver for communication with various other devices over a transmission medium.

The processor 1700 may take charge of managing the bus architecture as well as general processings. The memory 1720 may store therein data for the operation of the processor 1700.

It should be appreciated that, the memory 1720 is not limited to be located on the terminal, and the memory 1720 and the processor 1700 may be arranged at different geographical positions.

In a possible embodiment of the present disclosure, the N TAs correspond to the N SRS resource sets respectively.

In a possible embodiment of the present disclosure, the first configuration message is used to indicate adjustment values for the N TAs, and the transceiver 1710 or the processor 1700 is configured to determine and update the N TAs in accordance with the adjustment values for the N TAs and the N TAs maintained by the terminal.

In a possible embodiment of the present disclosure, initial TAs of the N TAs are same.

In a possible embodiment of the present disclosure, the transceiver 1710 is further configured to: transmit a first signal to the network side device through one or more antennas in the N antenna groups; and receive a first TA transmitted by the network side device, the first TA being obtained by the network side device through measuring the first signal, and the initial TA of the N TAs being the first TA transmitted by the network side device.

In a possible embodiment of the present disclosure, the transceiver 1710 is further configured to perform at least one of: transmitting PUSCH signal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or transmitting, by the terminal, PUCCH signal in accordance with a TA of PUCCH, wherein the TA of the PUCCH is a TA indicated by the network side device, or a TA corresponding to an SRS associated with the PUCCH, or a TA corresponding to an antenna. group for transmitting the PUCCH signal; or transmitting, by the terminal, a second SRS in accordance with the updated TA.

In a possible embodiment of the present disclosure, in the case that the TA of the PUSCH is the TA indicated by the network side device, the TA indicated by the network side device is one of the N TAs that corresponds to the PUSCH; and/or in the case that the TA of the PUCCH is the TA indicated by the network side device, the TA indicated by the network side device is one of the N TAs that corresponds to the PUCCH.

In a possible embodiment of the present disclosure, the transceiver 1710 is further configured to transmit a third SRS to the network side device on the N SRS resource sets through the N antenna groups respectively; receiving, by the terminal a second configuration message transmitted by the network side device, the second configuration message being used to indicate an adjustment value for a first TA, wherein the first TA is a TA which is determined by the network side device as having changed through measuring the third SRS on the N SRS resource sets. The transceiver 1710 or the processor 1700 is configured to determine and update the first TA in accordance with the adjustment value for the first TA and the first TA maintained by the terminal.

In a possible embodiment of the present disclosure, the first TA is a TA of the PUSCH, and the first TA maintained by the terminal is a TA corresponding to an SRS associated with the PUSCH and maintained by the terminal.

It should be appreciated that, the terminal may be a terminal in the above-mentioned TA configuration method, and the implementation of the terminal may refer to that of the TA configuration method for the terminal with a same beneficial effect, which will thus not be further particularly defined herein.

Figure 18:
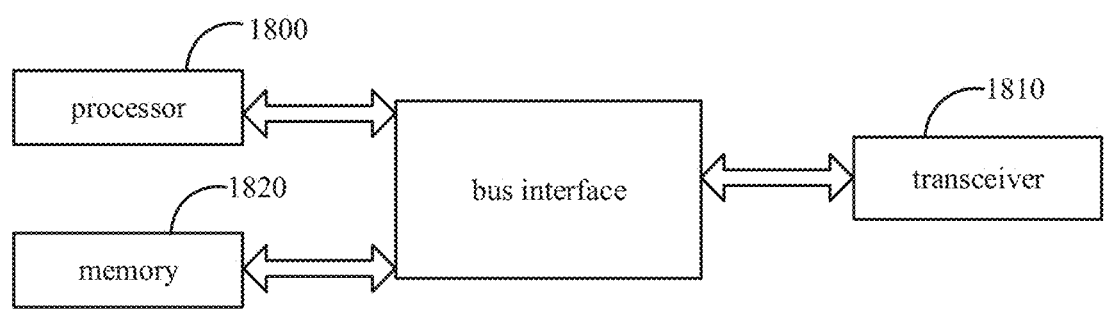
FIG. 18 is still yet another schematic view showing the network side device according to some embodiments of the present disclosure.

As shown in FIG. 18, the present disclosure provides in some embodiments a network side device which includes a transceiver 1810, a memory 1820, a processor 1800, and a program stored in the memory 1820 and executed by the processor. The transceiver 1810 is configured to measure a first SRS transmitted by a terminal on N SRS resource sets through N antenna groups respectively to determine N TAs, where N is an integer greater than 1. The transceiver 1810 is further configured to transmit a first configuration message to the terminal, the first configuration message is used to configure the N TAs, and the N TAs correspond to the N antenna groups respectively.

The transceiver 1810 is configured to receive and transmit data under the control of the processor 1800.

In FIG. 18, bus architecture may include a number of buses and bridges connected to each other, so as to connect various circuits for one or more processors 1800 and one or more memories 1820. In addition, as is known in the art, the bus architecture may be used to connect any other circuits, such as a circuit for a peripheral device, a circuit for a voltage stabilizer and a power management circuit. A bus interface may be provided, and the transceiver 1810 may include a plurality of elements, i.e., a transmitter and a receiver for communication with various other devices over a transmission medium.

The processor 1800 may take charge of managing the bus architecture as well as general processings. The memory 1820 may store therein data for the operation of the processor 1800.

It should be appreciated that, the memory 1820 is not limited to be located on the network side device, and the memory 1820 and the processor 1800 may be arranged at different geographical positions.

In a possible embodiment of the present disclosure, the N TAs correspond to the N SRS resource sets respectively.

In a possible embodiment of the present disclosure, the first configuration message is used to indicate adjustment values for the N TAs, to enable the terminal to determine and update the N TAs in accordance with the adjustment values for the N TAs and the N TAs maintained by the terminal.

In a possible embodiment of the present disclosure, initial TAs of the N TAs are same.

In a possible embodiment of the present disclosure, the transceiver 1810 is further configured to measure a first signal transmitted by the terminal through one or more antennas in the N antenna groups to determine a first TA, and transmit the first TA to the terminal. The initial TA of the N TAs is the first TA transmitted by the network side device.

In a possible embodiment of the present disclosure, the transceiver 1810 is further configured to perform at least one of: receive PUSCH signal transmitted by the terminal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or receive PUCCH signal transmitted by the terminal in accordance with a TA of PUCCH, wherein the TA of the PUCCH is a TA indicated by the network side device, or a TA corresponding to an SRS associated with the PUCCH, or a TA corresponding to an antenna group for transmitting the PUCCH signal; or receive a second SRS transmitted by the terminal in accordance with the updated TA.

In a possible embodiment of the present disclosure, in the case that the TA of the PUSCH is the TA indicated by the network side device, the TA indicated by the network side device is one of the N TAs that corresponds to the PUSCH; and/or in the case that the TA of the PUCCH is the TA indicated by the network side device, the TA indicated by the network side device is one of the N TAs that corresponds to the PUCCH.

In a possible embodiment of the present disclosure, the transceiver 1810 is further configured to: measure a third SRS transmitted by the terminal through the N antenna groups on the N SRS resource sets respectively to obtain an adjustment value for a first TA, wherein the first TA is a TA which is determined by the network side device as having changed through measuring the third SRS on the N SRS resource sets; and transmit a second configuration message to the terminal. The second configuration message is used to indicate the adjustment value for the first TA, to enable the terminal to determine and update the first TA in accordance with the adjustment value for the first TA and the first TA maintained by the terminal.

In a possible embodiment of the present disclosure, the first TA is a TA of the PUSCH, and the first TA maintained by the terminal is a TA corresponding to an SRS associated with the PUSCH and maintained by the terminal.

It should be appreciated that, the network side device may be a terminal in the above-mentioned TA configuration method, and the implementation of the network side device may refer to that of the TA configuration method for the network side device with a same beneficial effect, which will thus not be further particularly defined herein.

The present disclosure further provides in some embodiments a computer-readable storage medium storing therein a program. The program is executed by a processor, so as to implement the steps in the TA configuration method for the terminal or the steps in the TA configuration method for the network side device.

It should be further appreciated that, in the embodiments of the present disclosure, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include instructions so as to enable a computer device (a personal computer, a server or network device) to execute all or parts of the steps of the method according to the embodiments of the present disclosure. The storage medium includes any medium capable of storing therein program codes, e.g., a Universal Serial Bus (USB) flash disk, a mobile Hard Disk (HD), a Read-Only Memory (ROM), a Random Access Memory (RAM), a magnetic disk or an optical disk.

It should be appreciated that, the embodiments of the present disclosure may be implemented by hardware, software, firmware, middleware, microcode or a combination thereof. For the hardware implementation, modules, units, sub-modules, sub-units, etc. can be implemented in one or more of an Application Specific Integrated Circuit (ASIC), a Digital Signal Processor (DSP), a DSP device (DSPD). a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and capable of being executed by the processor. The memory may be implemented inside or outside the processor.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. It should be noted that, some steps may also be performed in parallel, or independently of each other.

The above are optional implementations of the present disclosure. It should be noted that a person skilled in the art may make further modifications and improvements without departing from the principle of the present disclosure, and these improvements and modifications should also be regarded as falling within the protection scope of the present disclosure.

What is claimed is:

1. A Timing Advance (TA) configuration method, comprising:
   transmitting, by a terminal, a first Sounding Reference Signal (SRS) to a network side device on N SRS resource sets through N antenna groups respectively, N being an integer greater than 1; and
   receiving, by the terminal, a first configuration message transmitted by the network side device, the first configuration message being used to configure N TAs, the N TAs corresponding to the N antenna groups respectively, the N TAs being obtained by the network side device through measuring the first SRS on the N SRS resource sets.

2. The TA configuration method according to claim 1, wherein the N TAs correspond to the N SRS resource sets respectively.

3. The TA configuration method according to claim 1, wherein the first configuration message is used to indicate adjustment values for the N TAs, and the TA configuration method further comprises:
   determining and updating, by the terminal, the N TAs in accordance with the adjustment values for the N TAs and the N TAs maintained by the terminal.

4. The TA configuration method according to claim 3, wherein initial TAs of the N TAs are same.

5. The TA configuration method according to claim 4, further comprising:
   transmitting, by the terminal, a first signal to the network side device through one or more antennas in the N antenna groups; and
   receiving, by the terminal, a first TA transmitted by the network side device, the first TA being obtained by the network side device through measuring the first signal, and the initial TA of the N TAs being the first TA transmitted by the network side device.

6. The TA configuration method according to claim 1, further comprising at least one of:
   transmitting, by the terminal, a Physical Uplink Shared Channel (PUSCH) signal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or
   transmitting, by the terminal, a Physical Uplink Control Channel (PUCCH) signal in accordance with a TA of PUCCH, wherein the TA of the PUCCH is a TA indicated by the network side device, or a TA corresponding to an SRS associated with the PUCCH, or a TA corresponding to an antenna group for transmitting the PUCCH signal; or
   transmitting, by the terminal, a second SRS in accordance with the updated TA.

7. The TA configuration method according to claim 6, wherein in the case that the TA of the PUSCH is the TA indicated by the network side device, the TA indicated by the network side device is one of the N TAs that corresponds to the PUSCH; and/or
   in the case that the TA of the PUCCH is the TA indicated by the network side device, the TA indicated by the network side device is one of the N TAs that corresponds to the PUCCH.

8. The TA configuration method according to claim 1, further comprising:
   transmitting, by the terminal, a third SRS to the network side device on the N SRS resource sets through the N antenna groups respectively;

receiving, by the terminal, a second configuration message transmitted by the network side device, the second configuration message being used to indicate an adjustment value for a first TA, wherein the first TA is a TA which is determined by the network side device as having changed through measuring the third SRS on the N SRS resource sets; and determining and updating, by the terminal, the first TA in accordance with the adjustment value for the first TA and the first TA maintained by the terminal.

9. A TA configuration method, comprising:

measuring, by a network side device, a first SRS transmitted by a terminal on N SRS resource sets through N antenna groups respectively to determine N TAs, N being an integer greater than 1; and transmitting, by the network side device, a first configuration message to the terminal, the first configuration message being used to configure the N TAs, and the N TAs corresponding to the N antenna groups respectively.

10. The TA configuration method according to claim 9, wherein the N TAs correspond to the N SRS resource sets respectively.

11. The TA configuration method according to claim 9, wherein the first configuration message is used to indicate adjustment values for the N TAs, and used for the terminal to determine and update the N TAs in accordance with the adjustment values for the N TAs and the N TAs maintained by the terminal.

12. The TA configuration method according to claim 11, wherein initial TAs of the N TAs are same.

13. The TA configuration method according to claim 12, further comprising:

measuring, by the network side device, a first signal transmitted by the terminal through one or more antennas in the N antenna groups to determine a first TA; and transmitting, by the network side device, the first TA to the terminal, the initial TA of the N TAs being the first TA transmitted by the network side device.

14. The TA configuration method according to claim 9, further comprising at least one of:

receiving, by the network side device, PUSCH signal transmitted by the terminal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or receiving, by the network side device, PUCCH signal transmitted by the terminal in accordance with a TA of PUCCH, wherein the TA of the PUCCH is a TA indicated by the network side device, or a TA corresponding to an SRS associated with the PUCCH, or a TA corresponding to an antenna group for transmitting the PUCCH signal; or receiving, by the network side device, a second SRS transmitted by the terminal in accordance with the updated TA.

15. The TA configuration method according to claim 14, wherein in the case that the TA of the PUSCH is the TA indicated by the network side device, the TA indicated by the network side device is one of the N TAs that corresponds to the PUSCH; and/or in the case that the TA of the PUCCH is the TA indicated by the network side device, the TA indicated by the network side device is one of the N TAs that corresponds to the PUCCH.

16. The TA configuration method according to claim 9, further comprising:

measuring, by the network side device, a third SRS transmitted by the terminal through the N antenna groups on the N SRS resource sets respectively to obtain an adjustment value for a first TA, wherein the first TA is a TA which is determined by the network side device as having changed through measuring the third SRS on the N SRS resource sets; and transmitting, by the network side device, a second configuration message to the terminal, the second configuration message being used to indicate the adjustment value for the first TA, and used for the terminal to determine and update the first TA in accordance with the adjustment value for the first TA and the first TA maintained by the terminal.

17. A network side device, comprising a transceiver, a memory, a processor, and a program stored in the memory and capable of being executed by the processor, wherein the processor is configured to execute the program to implement the TA configuration method according to claim 9.

18. A terminal, comprising a transceiver, a memory, a processor, and a program stored in the memory and capable of being executed by the processor, wherein the transceiver is configured to transmit a first SRS to a network side device on N SRS resource sets through N antenna groups respectively, N being an integer greater than 1, wherein the transceiver is further configured to receive a first configuration message transmitted by the network side device, the first configuration message is used to configure N TAs, the N TAs corresponding to the N antenna groups respectively, and the N TAs are obtained by the network side device through measuring the first SRS on the N SRS resource sets.

19. The terminal according to claim 18, wherein the first configuration message is used to indicate adjustment values for the N TAs, and the transceiver or the processor is configured to determine and update the N TAs in accordance with the adjustment values for the N TAs and the N TAs maintained by the terminal.

20. The terminal according claim 18, wherein the transceiver is further configured to perform at least one of:

transmitting PUSCH signal in accordance with a TA of PUSCH, wherein the TA of the PUSCH is a TA indicated by the network side device, or a TA corresponding to an SRS associated with the PUSCH, or a TA corresponding to an antenna group for transmitting the PUSCH signal; or transmitting PUCCH signal in accordance with a TA of PUCCH, wherein the TA of the PUCCH is a TA indicated by the network side device, or a TA corresponding to an SRS associated with the PUCCH, or a TA corresponding to an antenna group for transmitting the PUCCH signal; or transmitting a second SRS in accordance with the updated TA.

* * * * *